(12) United States Patent
Hayakawa et al.

(10) Patent No.: US 7,715,549 B2
(45) Date of Patent: *May 11, 2010

(54) COMMUNICATION TERMINAL DEVICE, HOLD MELODY SENDING METHOD, INCOMING MELODY PLAYING METHOD AND INFORMATION STORING MEDIUM

(75) Inventors: Toru Hayakawa, Ota-ku (JP); Shungo Kiyota, Shijyonawate (JP)

(73) Assignee: Helios Co., Ltd., Takatsuki (JP)

( * ) Notice: Subject to any disclaimer, the term of this patent is extended or adjusted under 35 U.S.C. 154(b) by 1063 days.

This patent is subject to a terminal disclaimer.

(21) Appl. No.: 11/206,785

(22) Filed: Aug. 19, 2005

(65) Prior Publication Data

US 2005/0276410 A1   Dec. 15, 2005

Related U.S. Application Data

(62) Division of application No. 10/297,918, filed as application No. PCT/JP01/05236 on Jun. 19, 2001, now Pat. No. 6,944,285.

(30) Foreign Application Priority Data

Jun. 22, 2000  (JP) .............................. 2000-188519
Jul. 3, 2000   (JP) .............................. 2000-201543

(51) Int. Cl.
  *H04M 1/00* (2006.01)
  *H04M 3/00* (2006.01)
(52) U.S. Cl. .............................. 379/373.03; 379/373.02
(58) Field of Classification Search ............ 379/373.02, 379/373.03
See application file for complete search history.

(56) References Cited

U.S. PATENT DOCUMENTS 6,373,925 B1 *  4/2002  Guercio et al. ................. 379/82

(Continued)

OTHER PUBLICATIONS

Patent Abstracts of Japan, JP 03-249867, Nov. 7, 1991.

(Continued)

*Primary Examiner*—Alexander Jamal
(74) *Attorney, Agent, or Firm*—Edwards Angell Palmer & Dodge LLP

(57) ABSTRACT

A control block recognizes the other party of the telephone call when both calling and called case. When the user operates the reservation melody key of the key input block while talking over the telephone and the telephone call reservation is directed, the control block retrieves telephone/E-mail memory and judges for the calling melody number whether to be registered. Because calling melody number 1 is registered, music data 1 is read, and the mute is placed "on" so that the voice from mike is not transmitted. When the control block outputs music data 1 to melody generation block, the melody generation block generates the calling melody signal based on music data 1, and transmits it to the other party of the telephone call via modem, sending and receiving block and antenna. Moreover, the control block always observes the control channel specified by the base station while waiting. When detecting the arrival of a call and "4" of the calling melody specification data, the control block judges for caller information transmitted at the same time whether to be registered in telephone/E-mail memory. In this case, the control block displays the caller number and Hanako Yamada of the name because it is registered in memory number 1. In addition, because the calling melody specification data is "4", "Good news" of the character data corresponding to it is displayed, and "Beautiful Sunday" of music data 4 registered in memory number 4 is performed as a calling melody.

2 Claims, 6 Drawing Sheets

U.S. PATENT DOCUMENTS 6,404,858 B1 * 6/2002 Farris et al. .............. 379/88.02
7,136,475 B1 * 11/2006 Rogers et al. .......... 379/213.01

OTHER PUBLICATIONS

Patent Abstracts of Japan, JP 2000-4276, Jan. 7, 2000.
Patent Abstracts of Japan, JP 10-257131, Sep. 25, 1998.
Patent Abstracts of Japan, JP 2000-124987, Apr. 28, 2000.
Patent Abstracts of Japan, JP 10-271191, Oct. 9, 1998.
Patent Abstracts of Japan, JP 08-154114, Jun. 11, 1996.
Patent Abstracts of Japan, JP 06-85889, Mar. 25, 1994.
Patent Abstracts of Japan, JP 08-336173, Dec. 17, 1996.
Patent Abstracts of Japan, JP 09-200303, Jul. 31, 1997.

* cited by examiner

Telephone Book
Registration Mode

Tel No. Input

No.1: Hanako Yamada
090-8765-4321
Calling Melody No.: 1

Telephone Book
Registration Mode

Tel No. Input

No.9: Taro Yamamoto
090-7777-7777
Calling Melody No.: N

Telephone Book
Registration Mode

Tel No. Input

No.2: Taro Yamamoto
090-7654-3210
Calling Melody No.: 2

FIG.6(A)

telephone / E-mail memory

| mem. No. | Tel. No. | Name | E-MAIL address | calling melody no. | Good news calling melody | Bad news calling melody |
|---|---|---|---|---|---|---|
| 1 | 090-8765-4321 | Hanako Yamada | NULL | 1 | 4 | 3 |
| 2 | 090-7654-3210 | Taro Yamamoto | taro@yyy.com | 2 | NULL | NULL |
| 3 | 090-6543-2109 | Jiro Yamashita | NULL | NULL | NULL | NULL |
| ... | ... | ... | ... | ... | ... | ... |
| N | NULL | NULL | NULL | NULL | NULL | NULL |

FIG.6(B)

calling melody memory

| mem. No. | calling melody data |
|---|---|
| 1 | Music data1 |
| 2 | Music data2 |
| 3 | Music data3 |
| 4 | Music data4 |
| ... | ... |
| N | Music dataN |

COMMUNICATION TERMINAL DEVICE, HOLD MELODY SENDING METHOD, INCOMING MELODY PLAYING METHOD AND INFORMATION STORING MEDIUM

CROSS REFERENCE TO RELATED APPLICATION

This application is a division of Ser. No. 10/297,918, filed Mar. 17, 2003, now U.S. Pat. No. 6,944,285. This application is a 35 U.S.C. 371 application of international application No. PCT/JP01/05236 filed Jun. 19, 2001, which is based on Japanese Application Nos. 2000-188519 filed Jun. 22, 2000 and 2000-201543 filed Jul. 3, 2000.

BACKGROUND OF THE INVENTION

1. Field of the Invention

The present invention relates to a communication terminal equipment, a reservation melody sending method and a calling melody performing method. In detail, the invention relates to communication terminal equipment and a reservation melody sending method which informs of the arrival of a call by a calling melody associated with telephone number information, when caller information received in the arrival of a call corresponds to telephone number information memorized in the telephone book memory, or communication terminal equipment and a calling melody performing method which informs of the arrival of a call by reading and performing a calling melody corresponding to caller information received in the arrival of a call.

Moreover, this invention relates to an information storage medium recording the program which performs those procedures of the method to semiconductor memory, LD (laser disc), HD (hard disk), FD (flexible disk), MD (mini disc), CD (compact disk) or DVD (digital videodisc).

2. Description of the Related Art

In recent years, the spread of a radio communication device represented by a Personal Digital Assistant and a portable telephone is remarkable. Especially, with the phone call charges of a portable telephone, or the fall of the price of a phone call, there is coming a time when one person has one set and already serves as an indispensable item among young men.

In addition to a telephone call function which is a basic function, each telecommunication carrier is competing and commercializing those radio communication devices which have a character transceiver function, E-mail function which transmits and receives text data and various files, and Internet connectivity function represented by I-Mode of NTT DoCoMo (Registered Trademark) for a short period of time, and is aiming at the performance rise and the functional rise one after another. Still more, the conventional portable telephone is indicated by Provisional Publication No. OPH10-313338, OPH11-98248, OPH11-112554, OP2000-32142, etc. Because it is common knowledge, the detailed explanation is omitted.

By the way, the function which is a hit among young people especially and being able to say the de facto standard includes the calling melody function, and it can be said that communication terminal equipment which does not have this function is not new.

The user of these communication terminal equipments is making it understand only from listening to the calling melody by changing the calling melody into each other party of the telephone call, and knows who is calling. For instance, when assuming that it associates with a lover's telephone number and music "SHIROI-KOIBITOTACHI" was registered as a calling melody, the communication terminal equipment informs the user of arrival of a call from the lover by performing "SHIROI-KOIBITOTACHI", which is music corresponding to the telephone number as a calling melody when caller information is transmitted when calling in and the telephone number corresponds to it. As a result, the user can match how to talk and the spoken content to the lover by knowing the telephone from the lover beforehand.

By the way, in the indispensable function of a past cordless phone machine etc., the telephone call reservation function to make it throw reservation melody to other party of telephone call while talking over the telephone and listen is provided, and it is thought to adopt this function for the cellular phone.

This telephone call reservation function selects specified one by pushing the melody button or reservation button while talking over the telephone, for instance, from among several kinds of memorized reservation melodies and to reproduce. Although it is easy for the cellular phone to achieve the telephone call reservation function by a quite similar composition, but it is not avoided to become a cost improvement.

Moreover, in a past communication terminal equipment as it was the above-mentioned, because the calling melody corresponding to the other party is performed when a telephone call comes from a specific other party, the other party of the telephone call can be promptly known, but even the content that the other party of the telephone call tries to speak (the content that the other party tries to pass on in case of E-mail) is not informed of.

This invention is made in order to solve the above-described problem, and the purposes of this invention are to provide communication terminal equipment, a reservation melody sending method, an information storage medium which can achieve telephone call reservation function cheaply and more interestingly by using a calling melody function which is an indispensable function to communication terminal equipment.

The purposes of this invention are to provide communication terminal equipment, a calling melody performing method, an information storage medium which can inform of a rough content that a caller starts speaking beforehand, and obstruct specification of performance of calling melody from an unknown caller with malice by improving the calling melody function which is an indispensable function to the communication terminal equipment.

As prior art which seems to relate to this invention, although there is Provisional Publication No. OPH11-355393, this is that only transmits the rumbling pattern of the ring tone to the opponent, and that opponent's speaker rumbles based on it, so it is clear not to have the selection means, etc., which are a peculiar compositions to this invention.

In addition, as prior art quoted at the examination stage of Japanese Patent Office, although there are Provisional Publication Nos. 2000-124987, H10-271191, H8-154114, 2000-4276, H10-257131, H6-85889, H8-336173 and H9-200303, these do not deny novelty and inventive step of this invention.

SUMMARY OF THE INVENTION

In order to achieve the stated purpose, the present invention is a communication terminal equipment which informs of arrival of a call by a calling melody associated with telephone number information, when caller information received in the arrival of a call corresponds to telephone number information memorized in the telephone book memory, the equipment comprising: an instruction means for directing reservation of a telephone call; a storage part for memorizing calling melody data and reservation melody data; and a control part for specifying the other party talking over the telephone based on caller information received during arrival of a call or telephone number information used in a telephone call, and for calling melody control and reservation melody transmission control, wherein said control part reads the calling melody data corresponding to the other party who is specified and talking over the telephone from said storage part, and transmits the calling melody signal generated by said calling melody data to the other party talking, and further transmits information showing the calling melody is used when the calling melody signal is thrown as a reservation melody.

The communication terminal equipment further preferably includes a melody generation part for generating the calling melody based on the calling melody data read by said control part from the storage part.

The control part preferably makes the other party talking over the telephone confirm that the reservation melody is the calling melody by the voice, the character or the lighting of reservation lamp based on the information showing the calling melody is used.

The present invention is preferably a reservation melody sending method used in a communication terminal equipment which informs of arrival of a call by calling melody associated with telephone number information, when caller information received in arrival of a call is corresponding to telephone number information memorized in the telephone book memory, the method comprising the steps of: an instruction means directing reservation of telephone call; a storage part memorizing calling melody data and reservation melody data; and a control part specifying other party talking over the telephone based on caller information received in arrival of a call or telephone number information used in telephone call, and for calling melody control and reservation melody transmission control, wherein said control part reads the calling melody data corresponding to the other party who is specified and talking over the telephone from said storage part, and transmits the calling melody signal generated by said calling melody data to the other party talking, and further transmits information showing the calling melody is used when the calling melody signal is thrown as a reservation melody.

The reservation melody sending method preferably further includes a melody generation step of generating the calling melody based on the calling melody data read by said control part from the storage part.

The control part preferably makes the other party talking over the telephone confirm that the reservation melody is the calling melody by the voice, the character or the lighting of reservation lamp based on the information showing the calling melody is used.

The present invention is preferably an information storage medium recorded program for executing reservation melody sending processing procedure in communication terminal equipment, where the communication terminal equipment informs of arrival of a call by a calling melody associated with telephone number information, when caller information received in the arrival of a call corresponds to telephone number information memorized in the telephone book memory, the reservation melody sending processing procedure comprising: an instruction procedure for directing reservation of telephone call; a storage procedure for memorizing calling melody data and reservation melody data; and a control procedure for specifying the other party talking over the telephone based on caller information received in arrival of a call or telephone number information used in telephone call, and for calling melody control and reservation melody transmission control; wherein the control procedure reads the calling melody data corresponding to the other party who is specified and talking over the telephone from the storage part, and transmits the calling melody signal generated by the calling melody data to the other party talking, and further transmits information showing the calling melody is used when the calling melody signal is thrown as a reservation melody.

The information storage medium further preferably includes a melody generation procedure for generating the calling melody based on the calling melody data read by the control procedure from the storage part.

The control procedure preferably makes the other party talking over the telephone confirm that the reservation melody is the calling melody by the voice, the character or the lighting of reservation lamp based on the information showing the calling melody is used.

The present invention is preferably a communication terminal equipment which informs of arrival of a call by reading and performing calling melody corresponding to caller information received in arrival of a call, the equipment comprising: a specified information transmission means for transmitting specified information on calling melody which should be performed in arrival of a call; a specified information reception means for receiving the specified information; a selection means for selecting the calling melody to read and perform based on the caller information and the specified information received by the specified information reception means; a performance means for performing calling melody selected by the selection means; wherein the selection means selects the calling melody corresponding to the specified information by priority when both the caller information and the specified information are n received, but does not select the calling melody corresponding to the specified information when a telephone number corresponding to said caller information is not registered in a storage part to memorize telephone book data even in case of both the caller information and the specified information are received.

The present invention is preferably a calling melody performing method used in a communication terminal equipment which informs of arrival of a call by reading and performing a calling melody corresponding to caller information received in arrival of a call, the method comprising: a first step of transmitting specified information on a calling melody which should be performed in arrival of a call; a second step of receiving the specified information; a third step of selecting the calling melody to read and perform based on the caller information and the specified information received by the second step; a fourth step of performing calling melody selected by the third step; wherein the third step selects the calling melody corresponding to the specified information by priority when both the caller information and the specified information are received, but does not select the calling melody corresponding to the specified information when a telephone number corresponding to the caller information is not registered in a storage part to memorize telephone book data even in case of a reservation lamp based on the information showing the calling melody is used.

The present invention is an information storage medium recorded program for executing reservation melody sending processing procedure in communication terminal equipment, where the communication terminal equipment informs of arrival of a call by a calling melody associated with telephone number information, when caller information received in the arrival of a call corresponds to telephone number information memorized in the telephone book memory, the reservation melody sending processing procedure comprising: an instruction procedure for directing reservation of telephone call; a storage procedure for memorizing calling melody data and reservation melody data; and a control procedure for specifying other party talking over the telephone based on caller information received in arrival of a call or telephone number information used in telephone call, and for calling melody control and reservation melody transmission control; wherein the control procedure reads the calling melody data corresponding to the other party who is specified and talking over the telephone from the storage part, and transmits the calling melody signal generated by the calling melody data to the other party talking.

The control procedure preferably transmits information showing the calling melody is used when the calling melody signal is thrown as a reservation melody.

The control procedure preferably makes the other party talking over the telephone confirm that the reservation melody is the calling melody by the voice, the character or the lighting of reservation lamp based on the information showing the calling melody is used.

The present invention is a communication terminal equipment which informs of arrival of a call by reading and performing a calling melody corresponding to caller information received in the arrival of a call, the equipment comprising: a specified information transmission means for transmitting specified information on the calling melody which should be performed in the arrival of a call; a specified information reception means for receiving the specified information; a selection means for selecting the calling melody to read and perform based on the caller information and the specified information received by the specified information reception means; a performance means for performing calling melody selected by the selection means; wherein the selection means selects the calling melody corresponding to both the specified information and said specified information are received, but does not select the calling melody corresponding to the specified information when a telephone number corresponding to the caller information is not registered in a storage part to memorize telephone book data even in case of both the caller information and the specified information are received.

The present invention is a calling melody performing method used in a communication terminal equipment which informs of arrival of a call by reading and performing calling melody corresponding to caller information received in arrival of a call, the method comprising: a first step of transmitting specified information on calling melody which should be performed in arrival of a call; a second step of receiving the specified information; a third step of selecting the calling melody to read and perform based on the caller information and the specified information received by the second step; a fourth step of performing calling melody selected by the third step; wherein the third step selects the calling melody corresponding to the specified information by priority when both the caller information and the specified information are received, but does not select the calling melody corresponding to the specified information when a telephone number corresponding to the caller information is not registered in a storage part to memorize telephone book data even in case of both the caller information and the specified information are received.

The present invention is an information storage medium recorded program for executing calling melody performance processing procedure in communication terminal equipment, the communication terminal equipment informs of arrival of a call by reading and performing a calling melody corresponding to caller information received in the arrival of a call, the calling melody performance processing procedure comprising: a specified information transmission procedure for transmitting specified information on calling melody which should be performed in the arrival of a call; a specified information reception procedure for receiving the specified information; a selection procedure for selecting the calling melody to read and perform based on the caller information and the specified information received by the specified information reception means; a performance procedure for performing calling melody selected by the selection means; wherein the selection procedure selects the calling melody corresponding to the specified information by priority when both the caller information and the specified information are received, but does not select the calling melody corresponding to the specified information when telephone number corresponding to the caller information is not registered in a storage part to memorize telephone book data even in case of both the caller information and the specified information are received.

The present invention is a communication terminal equipment which informs of arrival of a call by reading and performing a calling melody corresponding to caller information received in the arrival of a call, the equipment comprising: a storage part for memorizing telephone book data; a specified information reception means for receiving specified information on the calling melody which should be performed in the arrival of a call; a selection means for selecting the calling melody to read and perform based on the caller information and the specified information; a performance means for performing calling melody selected by the selection means; wherein the selection means does not select the calling melody corresponding to the specified information when a telephone number corresponding to the caller information is not registered in the storage part in case of the specified information are received.

The present invention is a calling melody performing method used in a communication terminal equipment which informs of arrival of a call by reading and performing a calling melody corresponding to caller information received in arrival of a call, the method comprising: a storage step of memorizing telephone book data; a specified information reception step of receiving specified information on a calling melody which should be performed in the arrival of a call; a selection step of selecting the calling melody to read and perform based on the caller information and the specified information; a performance step of performing calling melody selected by the selection step; wherein the selection step does not select the calling melody corresponding to the specified information when a telephone number corresponding to the caller information is not registered in the storage part in case of the specified information are received.

The present invention is an information storage medium recorded program for executing a calling melody performance processing procedure in communication terminal equipment, where the communication terminal equipment informs of arrival of a call by reading and performing calling melody corresponding to caller information received in arrival of a call, the calling melody performance processing procedure comprising: a storage procedure for memorizing telephone book data; a specified information reception procedure for receiving specified information on the calling melody which should be performed in arrival of a call; a selection procedure for selecting the calling melody to read and perform based on the caller information and the specified information; a performance procedure for performing calling melody selected by the selection procedure; wherein the selection procedure does not select the calling melody corresponding to the specified information when a telephone number corresponding to the caller information is not registered in the storage part in case the specified information is received.

The present invention is a communication terminal equipment which informs of arrival of a call by reading and performing a calling melody corresponding to caller information received in the arrival of a call, the equipment comprising: a storage part for memorizing telephone book data; a music data reception means for receiving music data of calling melody to be performed in the arrival of a call; a selection means for selecting either the calling melody corresponding to the caller information or the music data received by the music data reception means; a performance means for performing calling melody or the music data selected by the selection means; wherein the selection means does not select said music data when the caller information is not registered in the storage part in case the music data is received.

The present invention is a calling melody performing method used in a communication terminal equipment which informs of arrival of a call by reading and performing a calling melody corresponding to caller information received in the arrival of a call, the method comprising: a storage step of memorizing telephone book data; a music data reception step of receiving music data of calling melody to be performed in the arrival of a call; a selection step of selecting either the calling melody corresponding to the caller information or the music data received by the music data reception step; a performance step of performing a calling melody or the music data selected by the selection step; wherein the selection step does not select the music data when the caller information is not registered in the storage part in case the music data is received.

The present invention is an information storage medium recorded program for executing calling melody performance processing procedure in communication terminal equipment, where the communication terminal equipment informs of the arrival of a call by reading and performing a calling melody corresponding to caller information received in the arrival of a call, the calling melody performance processing procedure comprising: a storage procedure for memorizing telephone book data; a music data reception procedure for receiving music data of the calling melody to be performed in the arrival of a call; a selection procedure for selecting either the calling melody corresponding to the caller information or the music data received by the music data reception procedure; a performance procedure for performing calling melody or the music data selected by the selection procedure; wherein the selection procedure does not select the music data when the caller information is not registered in the storage part in case the music data is received.

The present invention is a communication terminal equipment which informs of arrival of a call by reading and performing a calling melody corresponding to caller information received in the arrival of a call, the equipment comprising: when the communication terminal equipment is a calling side, a storage part for memorizing telephone book data which consists of communication party's data of memory number, name, and nickname, etc. and telephone numbers, and calling melody specification data of each memory number; a display part for displaying communication party memorized in the storage part by operation of key input part; a calling melody specification key for displaying item corresponding to calling melody specification data transmitted to communication network in the display part; a control part for calling to communication network side with telephone number of communication party displayed in the display part and the calling melody specification data by operation of communication key; when the called side, an information reception means for receiving caller information and the calling melody specification data transmitted; a selection means for selecting calling melody to be read and performed based on the caller information and the calling melody; a performance means for performing calling melody selected by the selection means; wherein the selection means selects the calling melody corresponding to the calling melody specification data when both the caller information and the calling melody specification data are received and if a telephone number corresponding to the caller information is registered in the storage part, but does not select the calling melody on corresponding to the calling melody specification data if a telephone number corresponding to said caller information is not registered in the storage part.

The control part preferably displays information corresponding to calling melody specification data received by the information reception means in the display part.

The present invention is a calling melody performing method used in a communication terminal equipment which informs of the arrival of a call by reading and performing a calling melody corresponding to caller information received in the arrival of a call, the method comprising: when the communication terminal equipment is a calling side, a storage step of memorizing telephone book data which consists of communication party's data of memory number, name, and nickname, etc. and telephone numbers, and calling melody specification data of each said memory number; a display step of displaying communication party memorized in the storage part by operation of key input part; a calling melody specification step of displaying an item corresponding to calling melody specification data transmitted to communication network in the display part; a control step of calling to the communication network side with telephone number of the communication party displayed in the display part and the calling melody specification data by operation of a communication key; when the communication terminal equipment is a called side, an information reception step of receiving caller information and the calling melody specification data transmitted; a selection step of selecting the calling melody to be read and performed based on the caller information and the calling melody; a performance step of performing calling melody selected by the selection step; wherein the selection step selects the calling melody corresponding to the calling melody specification data when both the caller information and the calling melody specification data are received and if a telephone number corresponding to the caller information is registered in the storage part, but does not select the calling number melody corresponding to the melody specification data if a telephone number corresponding to the caller information is not registered in the storage part.

The control step preferably displays information corresponding to calling melody specification data received by the information reception step in the display part.

BRIEF DESCRIPTION OF THE DRAWINGS

FIGS. 6(A) and 6(B) show a pattern diagrams of storage part included in the present invention.

DETAILED DESCRIPTION OF THE PREFERRED EMBODIMENTS

Embodiment 1

Reservation Melody

Figure 1:
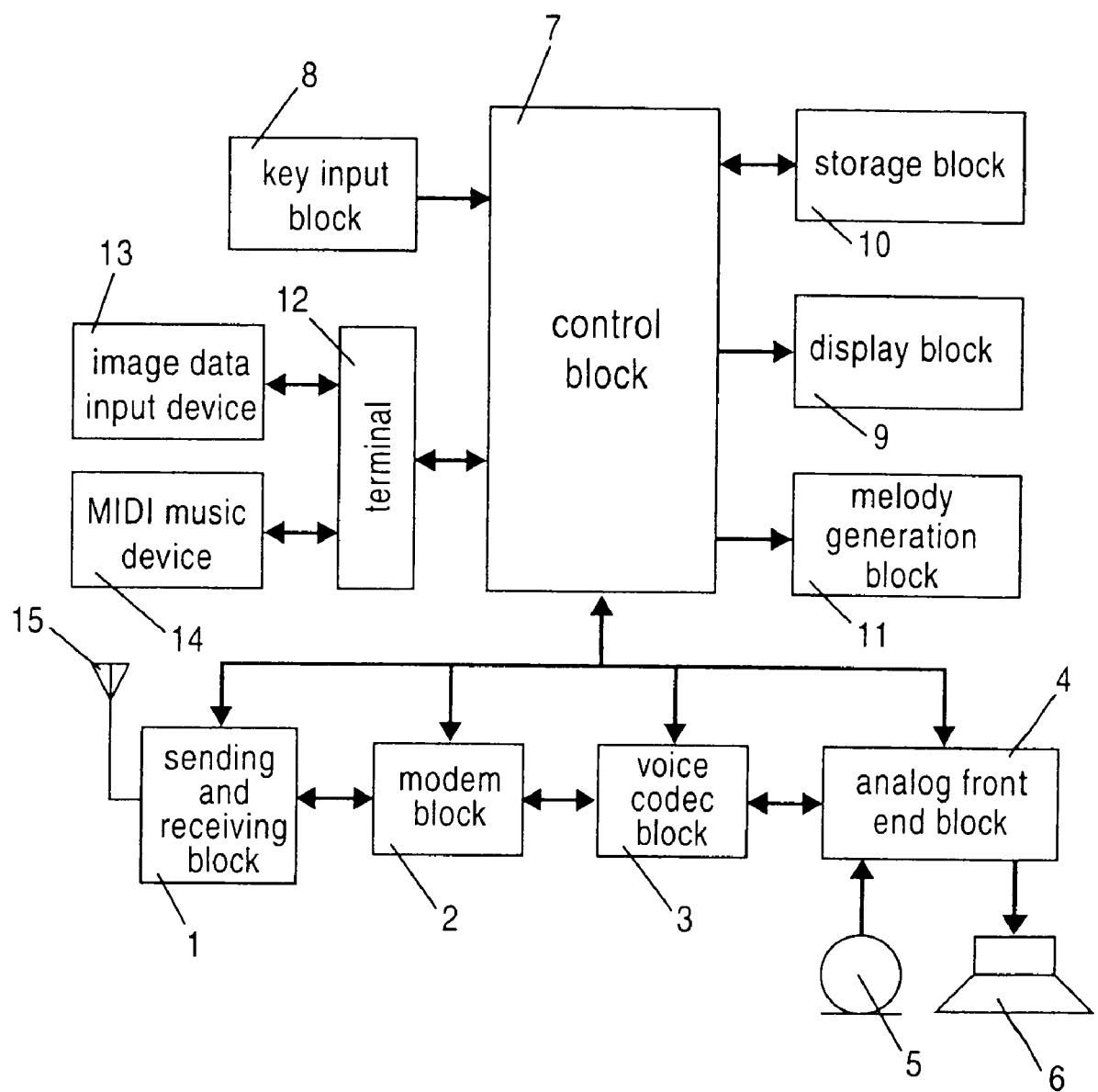
FIG. 1 shows a composition block chart of communication terminal equipment included in the present invention.

FIG. 1 shows a composition block chart of communication terminal equipment included in the present invention. In addition, a communication terminal equipment by this invention is suitable for not only GSM, PDC or PHS telecommunication equipment but CDMA (code division multiple access) telecommunication equipment used in the telecommunication system based on the IS-95 standard or the IMT-2000 standard of the third generation.

(1) is a sending and receiving block. The block (1) converts the electric wave signal received with antenna (15) into the intermediate frequency band, and converts the transmission signal of the intermediate frequency band into a radio frequency band and transmits the signal.

(2) is a modem block which modulates and demodulates the sending and receiving signal.

(3) is a voice code block which encodes and decodes the audio signal.

(4) is an analog front end block which converts the encoded audio signal from digital to analogue and drives receiver (6), and converts the audio signal input by mike (5) from analog to digital and outputs to voice codec (3).

(7) is a control block which controls all of the radio communication device like a control necessary for the telephone call (For instance, a control of positional registration, waiting, link establishment and hand over so on) and the display control, etc. Especially, the control block (7) controls the calling melody control including the calling melody specification control and the calling melody sending and receiving control, etc., the reservation melody transmission control, the telephone number notification control, and the telephone number storage control, etc.

The control block (7) specifies the other party who is talking over the telephone based on the calling number or the received other party number, and when the reservation melody is thrown, the control block (7) reads the calling melody data corresponding to the other party from the memory block (10) described later. In this calling melody specification control, when a call is made to the other party, the control block (7) transmits information which specifies the calling melody memorized in the other party's communication terminal equipment with various control signals, and makes the terminal perform a calling melody in the arrival of a call. Moreover, with the calling melody sending and receiving control, the control block (7) transmits specified data which specifies the calling melody memorized in the calling melody transmission server, and the control block (7) reads and transmits music data of the calling melody data corresponding to the other party directly from the memory block (10) described later with the call control signal.

(8) is a key input block which inputs necessary data by the operation of the user, etc.

(9) is a display block which consists of color liquid crystal display device (Hereafter, it is said, "Color LCD"), EL (electronic luminescence) and PDP (plasma display panel) etc., and displays necessary information like the caller data and the image data, etc.

(10) is a storage block which memorizes telephone book data used for calling or for transmitting E-mail, the image data, music data of calling melody and reservation melody (melody to wait for telephone communication) data, etc.

(11) is a melody generation block which generates the calling melody based on the music data of the calling melody memorized in the storage block (10) or the received music data. Moreover, when the reservation key of the key input block (8) is operated while talking over the telephone, the calling melody corresponding to the other party of the telephone call is transmitted via the modem block (2), the sending and receiving block (1), and the antenna (15). However, it might pass the voice codec block (3).

(12) is a terminal for a external connection. Via the terminal (12), the image data are input from an image data input device such as DSC (digital still camera) or DVC (digital video camera) and memorized into the storage block (10). Music data of the calling melody input from the music device (14) etc. corresponding to MIDI via the terminal (12) can also be memorized. Moreover, it is possible to memorize the telephone book data memorized in an old communication terminal equipment to a new communication terminal equipment by transmission.

Next, is an explanation the outline of the communication terminal equipment of this invention composed as the above-mentioned.

First of all, an explanation will be provided of the movement of the communication terminal equipment in the register mode of the telephone book data together with the operation of the user.

The user of the communication terminal equipment shifts it to the telephone book registration mode which registers the other party of the telephone call data by operating the key input block (8).

FIG. 2 shows a pattern diagrams of display part included in the present invention.

Figures 2A, 2B, 2C:
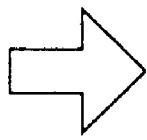
FIGS. 2(A), 2(B) and 2(C) show a pattern diagrams of display part included in the present invention.

The control block (7) presses the input of the name or the nickname, the telephone number and the calling melody number in the telephone book registration mode. FIG. 2(A) shows the user input Hanako Yamada as the name data, 090-8765-4321 as the telephone number data, and "1" as the calling melody number data of Memory Number 1.

It is also possible that the user may directly input by operating the key input block (8), as mentioned above. The user can correct and input data by calling the telephone book data just like the operation which selects the telephone number in call. FIG. 2(B) is the state that the user called memory number 9 of the telephone book data, and shows Taro Yamamoto as the name data, 090-7777-7777 as the telephone number data, and "N" as the calling melody number data. FIG. 2(C) is the state that the user corrected and input memory number 9 of the telephone book data, and shows Taro Yamamoto registered in memory number 9 has changed to memory number 2, 090-7654-3210 as the telephone number data and "2" as the calling melody number data.

FIG. 3 shows pattern diagrams of a storage part included in the present invention, and the state before and after the registration of the telephone book data and the calling melody data newly acquired.

Figures 3A, 3B:
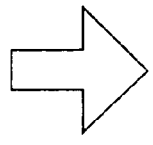
FIGS. 3(A) and 3(B) show a pattern diagrams of storage part included in the present invention.

FIG. 3(A) is the state before the registration of the telephone book data and the calling melody data. Insignificant "NULL" data has been entered as information for Memory Number 1 of telephone/E-mail memory, and telephone number information is not registered at all. In memory number 2, the data of 090-7654-3210 as the telephone number data, Taro Yamamoto as the name data, taro@yyy.com as the E-MAIL address data and "2" as the calling melody number data are registered. In memory number 3, the data of 090-6543-2109 as the telephone number data, Jiro Yamashita as the name data, "NULL" as the E-MAIL address data and "NULL" as the calling melody number data are registered. The state of registration from memory number 4 to memory number N is the same as memory number 1.

In the state of this FIG. 3(A), FIG. 3(B) is the state after the registration of the telephone book data of memory number 1 and the calling melody data of memory number 4. In memory number 1 of telephone/E-mail memory, the data of 090-8765-4321 as the telephone number data, Hanako Yamada as the name data, "NULL" data as the E-MAIL address data and "1" as the calling melody number data are registered newly. Although the registration screen of the E-MAIL address is not displayed in FIG. 2, one may make the registration demand by only expanding the registration item of the E-MAIL address into the same screen.

Moreover, music data 4 is newly registered in memory number 4 of the calling melody memory. As this registration operation, the user operates key input block (8) for instance and the calling melody data is input directly, or the data is obtained from the music device for MIDI, etc. via the external terminal (12). In addition, if the calling melody service is used, it is also possible to receive the calling melody data of the desire from the calling melody server via a wireless communication network and to memorize it. Music data N is memorized as default music data, and when the calling melody number is not specified, it is played as a calling melody and a reservation melody. However, default music data N can make it memorize not only one but also several besides.

"Beautiful Sunday" of the music which becomes happy, for instance, is registered as music data 4, and it is performed for a good news. Alternatively, "Dead March" of the music which becomes sad is registered as music data 3, and it performs for a bad news.

Next, it explains the reservation melody sending operation in the state of the memory of FIG. 3(B) together with the operation of the user.

First of all, it is assumed that the user of the communication terminal equipment is talking over the telephone to Hanako Yamada of memory number 1 (The telephone number: 090-8765-4321) according to a well-known communication procedure.

The control block (7) recognizes the other party of the telephone call by 090-8765-4321 which is the telephone number to the self did the dial when call is done (That is, when calling), or by 090-8765-4321 which is the other party number received from the communication network when it is calling in (That is, when you receive the telephone). However, the control block (7) recognizing the other party of the communication is acceptable that the E-MAIL address or URL, etc., that were not limited to a telephone number alone, and associated by the other party of the communication memorized in the storage block (10).

With this telephone call state, when the user of the communication terminal equipment operates the reservation melody key of key input block (8) and the telephone call reservation is directed, the control block (7) retrieves telephone/E-mail memory based on 090-8765-4321 which the telephone number to the self did the dial or is the received other party number, and judges for the calling melody number whether to be registered or not.

In this case, because calling melody number 1 is registered, the control block (7) reads music data 1 of memory number 1 from the calling melody memory, and puts the mute on so that the voice from mike (5) is not transmitted. In this case, because calling melody number 1 is registered, control part 7 reads music data 1 of memory number 1 from the calling melody memory. As how to put the mute, the input from mike (5) is turned off with the switch, and the method of dropping the input edge to the ground, etc., is acceptable.

When music data 1 that the control block (7) read is output to the melody generation block (11), the melody generation block (11) sounds the calling melody as well as the case of arrival of a call based on music data 1, and generates the calling melody signal and transmits to Hanako Yamada who is the other party of the telephone call via modem (2), the sending and receiving block (1), and antenna (15). As a result, Hanako Yamada will listen to the same reservation melody as the calling melody while reserving the telephone call. In addition, the information which shows that the calling melody is used when the calling melody is thrown as a reservation melody is transmitted, and the telephone call opponent is informed that "Calling melody reservation" is used for instance, by the voice, the character or the lighting of reservation lamp, etc. The telephone call opponent (in this case, Hanako Yamada) can confirm the calling melody which rings when the user is called, and the conversation afterwards might become happy too.

Afterwards, it is possible to talk with the other party of the telephone call by returning to former state of the telephone call by operating the reservation melody key again (for instance, operation pushed only once).

Embodiment 2

Calling Melody

Next, an explanation will be provided about the calling melody performance operation together with the operation of the calling side and the called side by the 1st and 2nd example in the state of memory of FIG. 3(B), and the 3rd example in state of memory of FIG. 6.

The 1st Example:

FIG. 4 shows a pattern diagrams of display part included in the present invention.

First of all, it is assumed that Hanako Yamada who is a caller (The bureau telephone number: 090-8765-4321) tries to call a called side user (in this case, Taro Yamada).

Figure 4A:
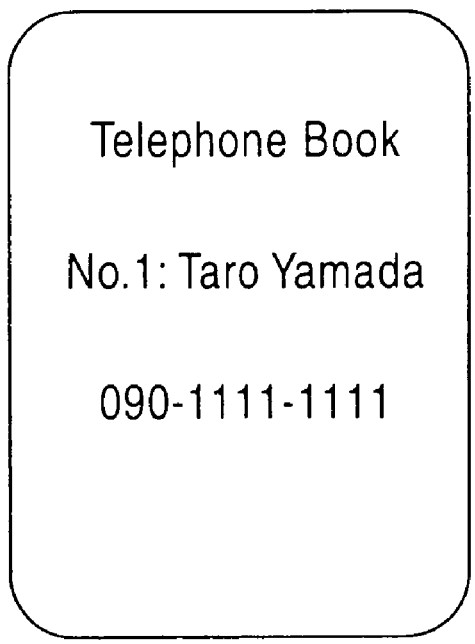
FIGS. 4(A), 4(B) and 4(C) show a pattern diagrams of display part included in the present invention.

FIG. 4(A) is the state after the registration of the telephone book data of memory number 1 and the calling melody data of memory number 4. In memory number 1 of telephone/E-mail memory, the data of 090-8765-4321 as the telephone number data, Hanako Yamada as the name data, "NULL" data as the E-MAIL address data and "I" as the calling melody number data are registered newly. Although the registration screen of the E-MAIL address is not displayed in FIG. 2, however, one may perform the registration demand by only expanding the registration item of the E-MAIL address into the same screen. The user operates key input block (8), for instance, and the calling melody data.

FIG. 4(A) is the state that Hanako Yamada operated key input block (8) and called data of Taro Yamada (The bureau telephone number: 090-1111-1111) from the telephone book memory of storage block (10). Under such a condition, when the calling melody specification key of the key input block (8) is pushed, the control block (7) displays "Good news" first (Refer to FIG. 4(B)). When the calling melody specification key is continuously pushed, the control block (7) displays "Bad news" (Refer to FIG. 4(C)). in addition, when the calling melody specification key is pushed, the control block (7) returns to the state without the item of the calling melody as shown in FIG. 4(A). However, the item can be added if necessary for instance like "Happy news" and "Sad news", etc. though it explains only two "Good news" and "Bad news" in this execution example.

Figure 4B:
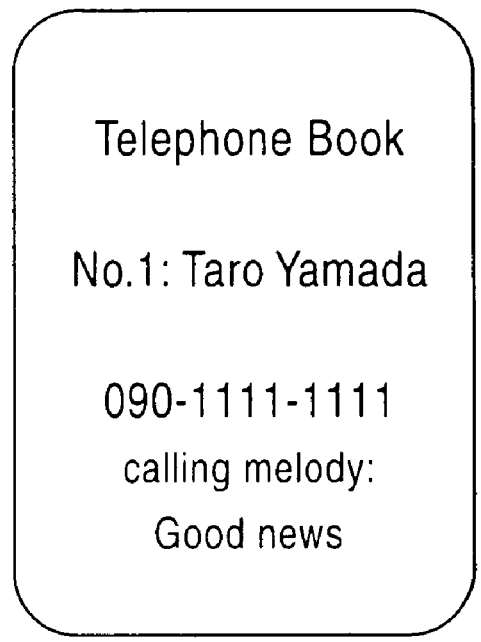
Figure 4B:
Figure 4C:
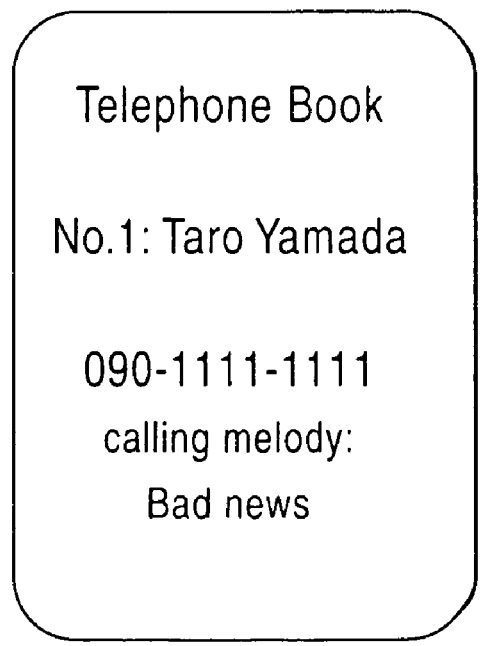

Next, in the state of this FIG. 4(B), when Hanako Yamada operates the telephone call key of the key input block (8), the control block (7) reads the telephone number "090-1111-1111" and the calling melody specification data "4" from telephone/E-mail memory of storage block (10), and transmits various control data to the communication network via the base station according to a well-known communication procedure, and calls Taro Yamada. Further, the calling melody specification data transmitted for "Good news" or "Bad news" is registered independently in each memory number though it is not specified in FIG. 3. That is to say, the data of "Good news" is "4" and the data value of "Bad news" is "3" for Taro Yamada, but different data may be registered for other parties of the telephone call. When the call instruction from Hanako Yamada to Taro Yamada is received, the communication network informs that there was arrival of a call to 090-1111-1111 and the calling melody specification data is "4", and calls the communication terminal equipment of Taro Yamada.

FIG. 5 shows a pattern diagrams of display part included in the present invention.

The control block (7) of the communication terminal equipment that Taro Yamada always observes the control channel specified by the base station while waiting. When detecting the arrival of a call to itself and the calling melody specification data is "4", the control block (7) judges for 090-8765-4321 of caller information transmitted at the same time whether to be registered in telephone/E-mail memory of the memory block (10). In this case, because 090-8765-4321 is registered in memory number 1, the control block (7) displays the caller number and Hanako Yamada of the name. In addition, because the calling melody specification data is "4", "Good news" of the character data corresponding to it is displayed, and the control block (7) performs "Beautiful Sunday" of music data 4 registered in memory number 4 as a calling melody (Refer to FIG. 5(A)).

Figure 5A:
FIGS. 5(A), 5(B), 5(C) and 5(D) show a pattern diagrams of display part included in the present invention.
Figure 5B:
Figure 5C:
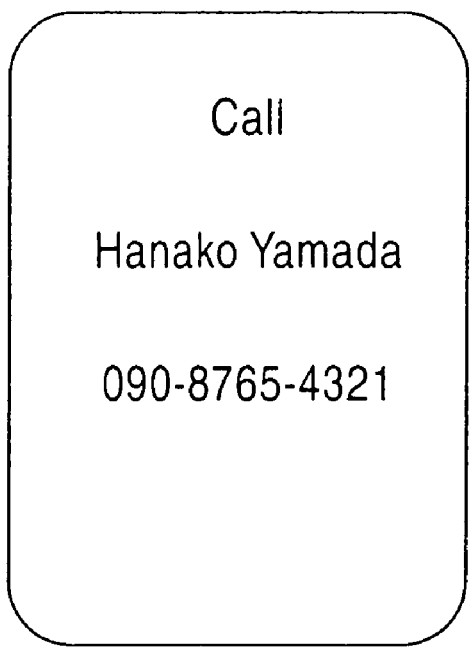
Figure 5D:

When "3" of the calling melody specification data is received, the control block (7) displays "Bad news" and performs "Dead march" of music data 3 registered in memory number 3 here (Refer to FIG. 5(B)). Moreover, when the calling melody specification data is not received, the control block (7) only performs music data 1 registered in memory number 1, and does not display "Good news" or "Bad news" (Refer to FIG. 5(C)). Still more, when the received caller information (090-2222-2222 for instance) is not registered in telephone/E-mail memory of the memory block (10), the control block (7) does not perform the music data corresponding to the calling melody specification data even if it is transmitted, and generate the ring tone of an uncertain caller (Refer to FIG. 5(D)). When Taro Yamada pushes the communication key after this, the control block (7) connects the telecommunication line according to the prescribed link establishment procedure provided by the communication standard, and is put into the state which can be talked over the telephone.

However, the calling melody specification data was specified by the number in the example of the first above-mentioned execution, but only information "Good news" or "Bad news" may be transmitted, and the calling melody might be performed corresponding to it on the called side. Moreover, when caller information is not registered in the telephone/E-mail memory of the memory block (10), the music data corresponding to it may not be performed in this case.

The 2nd Example:

An explanation will be provided of the example of the second execution when Hanako Yamada calls Taro Yamada by using FIG. 4 and FIG. 5 as well as the example of the first execution. However, the explanation of FIG. 4(A) omits the overlap description because it is the same.

In the state of FIG. 4(B), when Hanako Yamada operates the telephone call key of the key input block (8), the control block (7) reads 090-1111-1111 of the telephone numbers and the music data 4 of calling melody for "Good news" from telephone/E-mail memory of the memory block (10), and transmits various control data to the communication network via the base station according to a prescribed communication procedure, and calls Taro Yamada. In this case, the control block (7) transmits the information which shows "Good news" instead of transmitting music data 4 directly to the communication network, and the calling melody server of the communication network may transmit the music data for "Good news" specified beforehand to Taro Yamada.

When the call instruction from Hanako Yamada to Taro Yamada is received, the communication network informs the arrival of a call to 090-1111-1111 through the control channel (stopping tree channel or paging channel, etc.) of the base station. The communication network receives the music data 4 transmitted or the music data for "Good news" from the calling melody server and memorizes in the calling melody storage buffer once, and calls the communication terminal equipment of Taro Yamada.

Now, an explanation will be provided with reference to FIG. 5. The control block (7) of the communication terminal equipment that Taro Yamada has always observed the control channel specified by the base station while waiting. When the arrival of a call to itself is detected, the control block (7) transmits information (It is shown this information is to be able to receive the calling melody) which shows that it is in the state of the standby to the communication network.

When the information which shows in the standby state is received, the communication network transmits the music data for "Good news" memorized in the calling melody storage buffer once to the communication terminal equipment via the control channel.

The communication terminal equipment judges for 090-8765-4321 of caller information whether to be registered in telephone/E-mail memory of the storage block (10) when the caller information transmitted in arrival of a call and the music data of the calling melody for "Good news" is received. In this case, because 090-8765-4321 is registered in memory number 1, the control block (7) displays the caller number and the name of Hanako Yamada. In addition, the control block (7) displays "Good news" which is the character data corresponding to it from the information which notifies "Good news" inserted in the music data, and performs the received music data as a calling melody (Refer to FIG. 5(A)).

When the music data is the one to notify "Bad news", the control block (7) displays "Bad news" (Refer to FIG. 5(B)). Further, the explanation from FIG. 5(C) to the state which can be talked over the telephone is omitted because it is similar to the description of the example of the first execution.

The 3rd Example:

Explanation will be provided of the example of the third execution when Hanako Yamada calls Taro Yamada by using from FIG. 4 to FIG. 6.

FIGS. 6(A) and 6(B) show a pattern diagrams of storage part included in the present invention and the state (Correspond to FIG. 3(B)) after the telephone book data and the calling melody data newly acquired are registered. However, the explanation which overlaps in FIG. 3(A) and FIG. 3(B) is omitted.

In FIG. 6(A), the data of 090-8765-4321 as the telephone number data, Hanako Yamada as the name data, "NULL" data as the E-MAIL address data and "1" as the calling melody number data are registered in memory number 1 of telephone/E-mail memory. Moreover, No. 4 as a calling melody of a good news and No. 3 as a calling melody of a bad news are registered. Further, FIG. 6(B) shows the registration state of the calling melody memory.

In the state of FIG. 6(B), when Hanako Yamada operates the communication key of the key input block (8), the control block (7) transmits 090-1111-1111 of the telephone numbers and the information which shows "Good news" (For instance, the bit of numeric data 4 and a good information flag is set up.) from telephone/E-mail memory of the storage block (10) and various control data to the communication network via the base station according to a prescribed communication procedure, and calls Taro Yamada. In this case, the information which shows "Good news" or "Bad news" is not registered independently in each memory number. That is, the same data is registered even if the other party of the communication changes, and is transmitted.

When the call instruction from Hanako Yamada to Taro Yamada is received, the communication network informs the arrival of a call to 090-1111-1111 through the control channel (stopping tree channel or paging channel, etc.) of the base station and the information which shows the calling melody specification data shows "Good news", and calls the communication terminal equipment of Taro Yamada.

The control block (7) of the communication terminal equipment that Taro Yamada has always observes the control channel specified by the base station while waiting. When the arrival of a call to itself is detected and the calling melody specification data is the information showing "Good news", the control block (7) judges for 090-8765-4321 of the caller information transmitted at the same time whether to be registered in telephone/E-mail memory of the storage block (10). In this case, because 090-8765-4321 is registered in memory number 1, the control block (7) displays the caller number and Hanako Yamada of the name, and displays "Good news" of the character data corresponding to it because the information of the calling melody specification data shows "Good news" in addition, and further performs "Beautiful Sunday" of music data 4 registered in memory number 4 as a calling melody (Refer to FIG. 5(A)).

When the information which shows "Bad news" of the calling melody specification data is received, the control block (7) displays "Bad news", and performs "Dead march" of music data registered in memory number 3 here (Refer to FIG. 5(B)).

However, if the caller information is not registered in the telephone/E-mail memory of the storage block (10) when the calling melody specification data is received, the control block (7) does not select and perform the calling melody based on the calling melody specification data. Further, the explanation from FIG. 5(C) to entering the state which can be talked over the telephone is omitted, because it is similar to the description of the example of the first execution.

Moreover, as mentioned above, it can be assumed that a reservation melody sending method or a calling melody performing method of this invention by assuming the step or the process in the time series where each operation of the communication terminal equipment is explained in Embodiment 1 and Embodiment 2.

In addition, the program which provides for the processing procedure of each operation that the control block of the communication terminal equipment does is memorized in the information storage medium (for instance, semiconductor memory, LD (laser disc), HD (hard disk), FD (flexible disk), MD (mini-disc), CD (compact disc) or DVD (digital video disc, etc.), and similar operation can be done by installing the processing procedure (for instance, application program) in various information processors.

According to the communication terminal equipment, the reservation melody sending method and the information storage medium of this invention, as explained above, it is not necessary to provide the reservation melody generation device separately because the calling melody corresponding to the other party of the telephone call is sent to the telephone call line as a reservation melody when the reservation operation is done while talking over the telephone. The communication terminal equipment becomes cheap only as for the amount. Moreover, the interest increases because the other party of the telephone call can listen to the calling melody which flows when the call is done, too.

According to the communication terminal equipment, the calling melody performing method and the information storage medium which lies this invention as explained above, because the calling melody that the caller side specified or transmitted is performed according to the content which tries to be passed on and the content is displayed even if the calling melody corresponding to the other party is composed to be performed when the telephone hangs from a specific other party registered in telephone/E-mail memory, the called person can learn the outline beforehand.

On the other hand, if caller information is not registered in telephone/E-mail memory though it is time when received the calling melody specification data, the calling melody based on the calling melody specification data is not selected and not performed, so it is possible to obstruct the performance of calling melody by malice.

The invention claimed is:

1. A communication system having a communication network including a base station and a terminal equipment operated by a user, where the base station transmits a caller information of another communication terminal to the terminal equipment and the terminal equipment informs of arrival of a call by reading and performing a calling melody corresponding to said caller information of the communication terminal received in arrival of a call, the system comprising:
   a storage part arranged in the network side for memorizing telephone book data by operating of the terminal equipment;
   a specified information reception means arranged in the network side for receiving specified information from the terminal equipment for a melody which should be performed in a call from the communication terminal;
   a selection means arranged in the network side for selecting the melody to read and perform based on said caller information of the communication terminal and said specified information from the terminal equipment;
   a performance means arranged in the network side for performing the melody selected by said selection means, wherein said selection means does not select the melody corresponding to said specified information when a telephone number corresponding to said caller information of the communication terminal is not registered in said storage part in case said specified information is received.

2. A melody performing method used in a communication system having a communication network including a base station and a terminal equipment operated by a user, the base station transmits a caller information of another communication terminal to the terminal equipment and the terminal equipment informs of arrival of a call by reading and performing a calling melody corresponding to said caller information of the communication terminal received in arrival of a call, the method comprising:

a storage step for memorizing telephone book data in the network side by operating of the terminal equipment;

a specified information reception step for receiving specified information in the network side from the terminal equipment for a melody which should be performed in a call from the communication terminal;

a selection step by the network side for selecting the melody to read and perform based on said caller information and said specified information from the another terminal equipment;

a performance step by the network side for performing the melody selected by said selection step, wherein said selection step does not select the melody corresponding to said specified information when a telephone number corresponding to said caller information is not registered by said storage step in case said specified information is received.

* * * * *